United States Patent
Raghavan et al.

(10) Patent No.: US 6,996,647 B2
(45) Date of Patent: Feb. 7, 2006

(54) TOKEN SWAPPING FOR HOT SPOT MANAGEMENT

(75) Inventors: Ram Raghavan, Round Rock, TX (US); Wen-Tzer Thomas Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 10/738,722

(22) Filed: Dec. 17, 2003

(65) Prior Publication Data

US 2005/0138254 A1 Jun. 23, 2005

(51) Int. Cl.
  *G06F 13/14* (2006.01)
  *G06F 13/36* (2006.01)
  *H04J 3/17* (2006.01)

(52) U.S. Cl. ............ 710/240; 710/107; 710/111; 718/104; 370/450

(58) Field of Classification Search ........ 710/240, 710/305, 107, 104, 111, 116; 709/213, 250, 709/225, 253; 711/100, 147; 718/104; 370/257, 370/419, 450, 462, 451, 395.41; 340/825.5
See application file for complete search history.

(56) References Cited

U.S. PATENT DOCUMENTS

| | | | | |
|---|---|---|---|---|
| 4,491,946 A | * | 1/1985 | Kryskow et al. | 370/453 |
| 4,819,229 A | * | 4/1989 | Pritty et al. | 370/455 |
| 4,864,491 A | * | 9/1989 | Ohuchi | 712/25 |
| 4,930,121 A | * | 5/1990 | Shiobara | 370/451 |
| 5,367,679 A | * | 11/1994 | Khaira | 718/103 |
| 5,388,223 A | * | 2/1995 | Guthrie et al. | 370/448 |
| 5,434,861 A | * | 7/1995 | Pritty et al. | 370/449 |
| 6,073,132 A | * | 6/2000 | Gehman | 707/9 |
| 6,325,293 B1 | * | 12/2001 | Moreno | 235/492 |
| 6,714,553 B1 | * | 3/2004 | Poole et al. | 370/412 |

OTHER PUBLICATIONS

"Token ring arbitration circuits for dynamic priority algorithms" by Zhang et al. (abstract only) Publication date: Aug. 3-5, 1994.*

* cited by examiner

*Primary Examiner*—Gopal C. Ray
(74) *Attorney, Agent, or Firm*—Stephen J. Walder, Jr.; Diana R. Gerhardt (57) ABSTRACT

A method and apparatus are provided for efficiently managing hot spots in a resource managed computer system. The system utilizes a controller, a series of requestor groups, and a series of loan registers. The controller is configured to allocate and is configured to reallocate resources among the requestor groups to efficiently manage the computer system. The loan registers account for reallocated resources such that intended preallocation of use of shared resources is closely maintained. Hence, the computer system is able to operate efficiently while preventing any single requestor or group of requestors from monopolizing shared resources.

20 Claims, 4 Drawing Sheets

TOKEN SWAPPING FOR HOT SPOT MANAGEMENT

CROSS-REFERENCED APPLICATIONS

This application relates to co-pending U.S. patent applications Ser. No. 10/738,720 entitled "METHOD OF RESOURCE ALLOCATION USING AN ACCESS CONTROL MECHANISM", filed concurrently herewith.

BACKGROUND OF THE INVENTION

1. Technical Field

The present invention relates generally to resource management within a computing system, and more particularly, to reallocating unused resources according to both usage and fairness while maintaining the desired usage presets determined by a preallocation algorithm.

2. Description of the Related Art

Within a given computer architecture, such as a Broadband Engine, there exists a finite number of resources, such as memory or I/O, that are available for use. These resources are commonly referred to as shared resources. Typically, though, there is not a single desired use nor single user. Instead, there are usually multiple users competing for shared resources. These requests should be managed in such a way as to improve the use of the architecture construct, so as to have the most rapid response and limit the wasting of resources.

Moreover, there is a significant problem of starvation, where a user can be prevented from utilizing a given system or resource. Essentially, other users occupy the full bandwidth of a network or system. Typically, the system's or network's available bandwidth is allocated between the users wherein rules for allocation are set defining bandwidth limits depending on the class of user. Simple techniques, such as time multiplexing for applications or users and priority arbitration, have been utilized.

However, even time multiplexing and priority arbitration schemes lack controls and guarantees needed for real-time applications and usage. Essentially, applications or users can easily overrun a system or network leading to retries, long lag times, and overall poor performance. Some of the problems as a result of applications or users overrunning a system or networks are bottlenecks and denial of service. Schemes, which attempt to prevent the denial of service, usually result in wasting of resources, though.

However, once the computer system has begun operation, the allocation is not as simple as a percentage allocation. In fact, the varying users can be one of the two extremes for usage: sparse or high rate. If a user is a sparse user, the resource allocated to a sparse user can go unused. Hence, the available shared resources would be wasted. If a user is a high rate user, other competing user could be backlogged with pending requests for the shared resource. To alleviate the problem of backlogged requests and dead time on resources, algorithms, known as fairness algorithms, have been developed to reallocate the unused time on the shared resources to other requesters with pending requests.

A problem with according fairness is that it can skew the intended target allocation. High rate users can in fact steal bandwidth from more sparse users. By stealing the bandwidth, the preallocation percentages of use can be rendered virtually meaningless. The reason is that, thus far, there has not been an algorithm in place to reset the usage to the preallocation levels.

Therefore, there is a need for a method and/or apparatus for controlling the usage of resources that addresses at least some of the problems associated with conventional methods and apparatuses for controlling resources.

SUMMARY OF THE INVENTION

The present invention provides an apparatus, method, and computer program for managing tokens for usage of a shared resource in a computer system. There is at least comprise a plurality of shared resources coupled to the bus. Also, there is at least comprise a plurality of requester groups coupled to the bus. Each requester of the plurality of requestor groups at least has the ability to request the usage of at least a shared resource of a plurality of shared resources. A control module is also coupled to the bus. The control module is configured to allocate and is configured to reallocate tokens for usage of a shared resource. Also, a plurality of arbitration modules are coupled to the control module. At least one arbitration module of the plurality of arbitration modules is associated with at least one requestor group of the plurality of requester groups. A plurality of memory cells are coupled to the control module that account for reallocated tokens.

BRIEF DESCRIPTION OF THE DRAWINGS

For a more complete understanding of the present invention, and its advantages, references will now be made in the following Detailed Description to the accompanying drawings, in which.

DETAILED DESCRIPTION OF THE INVENTION

In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein can be performed in either hardware or software, or some combination thereof. In a preferred embodiment, however, the functions are performed by hardware, such as a computer or an electronic data processor, in accordance with code, such as computer program code, software, and/or integrated circuits that are coded to perform such functions, unless indicated otherwise.

Figure 1:
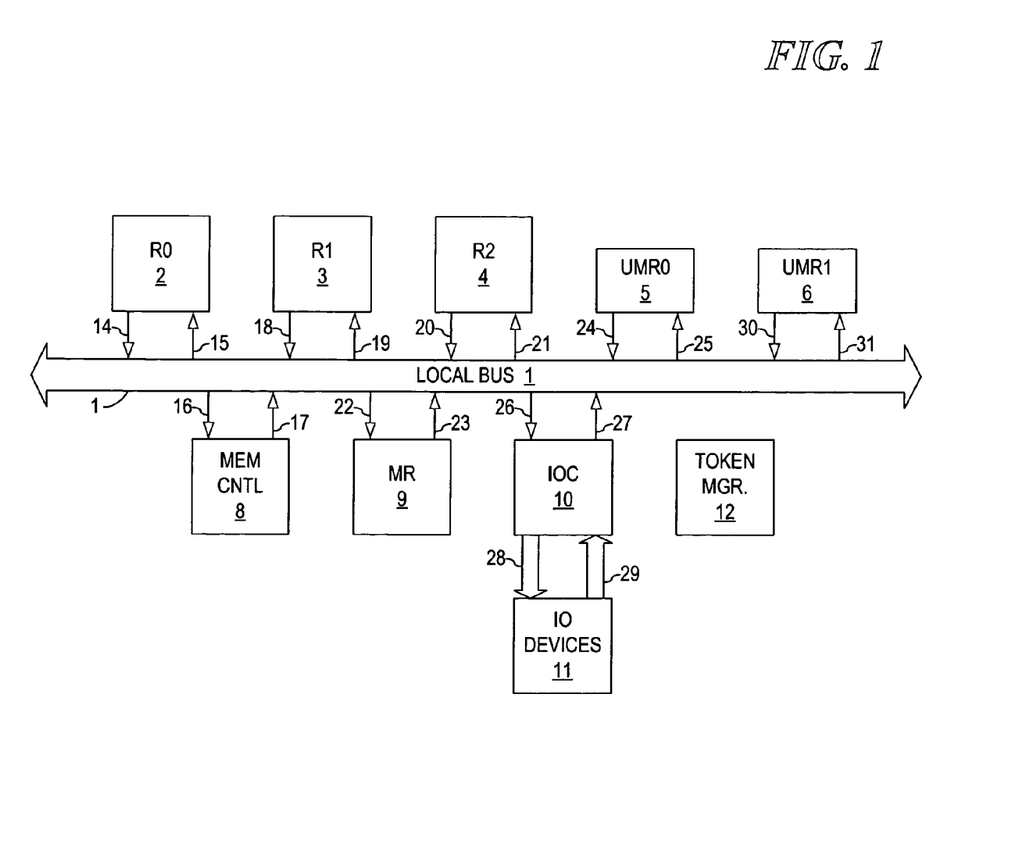
FIG. 1 depicts a block diagram of a system structure incorporating a token manager.

Referring to FIG. 1 of the drawings, the reference numeral 100 generally designates a block diagram illustrating a system structure that utilizes a Token Manager to alleviate the problems of denial of service and bottlenecks. Denials of service, delays, and bottlenecks are as a result of requesters, such as a Direct Memory Access (DMA) unit, or groups of requestors blocking other requesters from accessing a given resource. For example, a DMA unit occupying an Input/Output (IO) device and not allowing any other processor from utilizing the IO device is a denial of service.

The requesters, which could be a cache or DMA Controller, are labeled R0 2, R1 3, R2 4, and Input/Output Controller (IOC) 10 for four given requestors. These labeled requesters are devices that request usage of managed resources, such as IO devices, and unmanaged resources, such as Synchronous Dynamic Random Access Memory (SDRAM). There may be one or more requesters of varying types. For example, an IO controller 10 acts as a requester and a managed resource, whereas R0 2 is a requestor only.

Each of the requesters is further connected through a communication channel to the local bus 1. R0 2 is connected to the local bus 1 through a first communication channel 14 and a second communication channel 15. R1 3 is connected to the local bus 1 through a third communication channel 18 and a fourth communication channel 19. R2 4 is connected to the local bus 1 through a fifth communication channel 20 and a sixth communication channel 21. IOC is connected to the local bus 1 through a seventh communication channel 26 and an eighth communication channel 27. Each requester will have at least one or more communication channels connected to a given local bus that operate in a variety of manners. Moreover, any of the aforementioned communications channels would encompass wireless links, optical links, conductor cable links, packet switched channels, direct communication channels and any combination thereof.

The unmanaged resources are labeled UMR0 5 and UMR1 6 for two given unmanaged resources. There can be one or more unmanaged resources of a variety of types. An unmanaged resource is typically a resource that cannot be totally used by a single or small group of requesters and typically can not bottleneck.

Each of the unmanaged resources is further connected through a communication channel to the local bus 1. UMR0 5 is connected to the local bus 1 through a ninth communication channel 24 and a tenth communication channel 25. UMR1 6 is connected to the local bus 1 through an eleventh communication channel 30 and a twelfth communication channel 31. Each unmanaged resource will have at least one or more communication channels connected to a given local bus that operate in a variety of manners. Moreover, any of the aforementioned communications channels would encompass wireless links, optical links, conductor cable links, packet switched channels, direct communication channels and any combination thereof.

Typically, resources that relate to critical bottlenecks are managed. There can be one or more managed resources. The managed resources illustrated are the memory controller (Mem Cntl) 8, the managed resource (MR) 9, the IO controller (IOC) 10, and the IO devices 11. The managed resources are examples and illustrations of resources that can be used by multiple requesters at the same time. The immediate disclosure should not be read as limiting the number or type of managed resources.

There are a variety of interfaces between the managed resources and the local bus 1. The Mem Cntl 8 is connected to the local bus 1 through thirteenth communication channel 16 and a fourteenth communication channel 17. MR 9 is connected to the local bus 1 through a fifteenth communication channel 22 and a sixteenth communication channel 23. IOC 10 is connected to the local bus 1 through the seventh communication channel 26 and the eighth communication channel 27. It should be noted that the IOC 10 is a unique mechanism that operates as both a requester and a managed resource. However, there can be a multitude of other mechanisms that possess similar properties to the IOC 10. The use of a single IOC 10 is for the purposes of example and illustration and should not be read as limiting. Finally, IO devices 11 is connected to the IOC 10 through a sixteenth communication channel 28, and through a seventeenth communication channel 29. One should also note that the IO devices 11 are further under the control of the IOC 10. Thus, the seventh communication channel 26 and the eighth communication channel 27 of the IOC 10 are shared by the IOC 10 and IO devices 11. However, there are a multitude of other mechanisms that possess similar properties to the IO devices 11 and the IOC 10. The use of IO devices 11 and the IOC 10 is for the purposes of example and illustration and should not be read as limiting. Also, each managed resource will have at least one or more communication channels connected to a given local bus that operate in a variety of manners.

Moreover, certain paths of usage between the requestors and the managed resources have special designations. These paths are designated as Management Paths (MP). Most paths are multitude of communication channels and the local bus 1 that interconnect the requesters to the managed resources. For example, the first communication channel 14, the local bus 1, and the fifteenth communication channel 22 comprise an MP between the R0 2 and MR 9. The significance of the MPs are that a token is used for a communication across the given MP.

A token manager 12 is used to solve the problems of denial of service and bottlenecks. For example, a denial of service is a requester occupying all of the bandwidth of a IO device, preventing any other requester from using the IO device. Each requester is assigned a Resource Allocation ID (RAID), which is typically related to its register. Requestors with the same RAID are referred to as a Resource Allocation Group (RAGs). The token manager 12 allocates the usage for each managed resource for a given RAG. The characteristics of the RAGs are determined by software, and could be dynamically changed. Essentially, each RAG is allocated a predetermined percentage of bandwidth by software, which is based on the desired system performance. In order for a requestor within a RAG to communicate with or utilize a given managed resource, a token is granted, by the token manager, to the requester that allows for the utilization of a managed resource. Without a token, there can be no utilization of a managed resource.

Regarding the tokens, the token manager 12 does not arbitrarily assign the tokens. The token manager 12, instead, generates resource tokens for each RAG by virtue of a rate counter. Also, a given requester, though, cannot accumulate the tokens, and the sum of all rates for all of the RAGs must not exceed the capabilities of the resource.

However, in certain cases, such as IO devices 11, multiple tokens are required for communication with a resource. For example, when an IO device 11 accesses memory (not shown), there is both an IO Controller (IOC) 11 and a Memory Controller (Mem Cntl) 8 required to complete the transfer. Hence, for such a transfer, there is a requirement of two tokens, one for each Managed Resource (for example, the IO Controller and Memory Controller). Thus, tokens can be accumulated to complete a single task or communication in special cases wherein multiple tokens are required to perform a single task or communication, such as with IO devices 11.

Once the token manager 12 has assigned the token to a RAG, then the requester belonging to the RAG can utilize the token and initiate the communication. A requester must first generate an internal token request, which includes both a RAID and Managed Resource, and is then forwarded to the Token Manager. Upon reception of the given request, the Token Manager will grant the requested token if and when a token is assigned to the RAG. When all needed tokens are granted, the requester is then allowed to perform the pending request.

However, there can be times when the given RAG does not have a requester with a pending request for the available managed resource. At these specified times, a token can be granted to a requestor in another RAG. The problem of "hot spots," where two or more entities can try to access the same resource at about the same time, is generally alleviated by the use of a Token Manager 12. However, there can be another problem in that a specific requester or RAG can occupy a substantial portion of the bandwidth by virtue of borrowing, where one RAG borrows a token from another RAG. Hence, there is a need to structure a Token Manager to avoid at least some of the problems.

Figure 2:
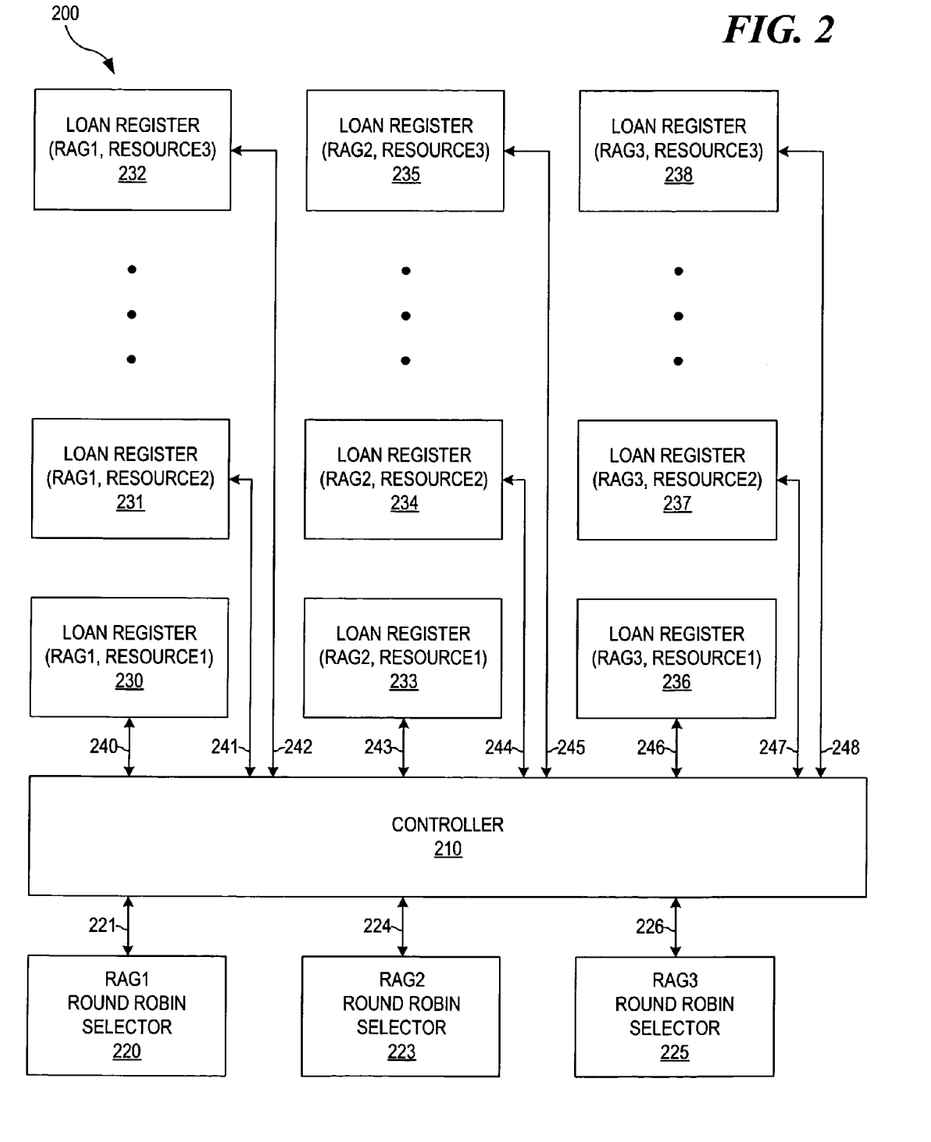
FIG. 2 depicts a block diagram illustrating a Token Manager to alleviate the problems of hot spots.

Referring to FIG. 2 of the drawings, the reference numeral 200 generally designates a block diagram illustrating a Token Manager to alleviate the problems of hot spots. The Token manager comprises a Contoller 210, a plurality of round-robin pointers 220, 223, and 225, and a plurality of loan registers 230, 231, 232, 233, 234, 235, 236, 237, and 238.

Within the token manager 12 of FIG. 1, there are a variety of devices performing specific duties that allow the proper performance of the token manager 12 of FIG. 1. The controller 210 is configured to be the device for providing communication and control of each allocation between the varying loan registers 230, 231, 232, 233, 234, 235, 236, 237, and 238 and round-robin selectors 220, 223, and 225. The controlling software assigns each requester to a RAG, assigns a RAID to each RAG, and controls resource allocation. Each RAG uses a round-robin pointer 220, 223, and 225 to cycle through the targets wherein a new token is generated each time the countdown timer times out for each target to determine if there is a pending request for a given resource.

The first round robin pointer for a first RAG 220 is interconnected to the controller 210 though a first communication channel 221. The second round robin pointer for a second RAG 223 is interconnected to the controller 210 though a second communication channel 224. The third round robin pointer for a third RAG 225 is interconnected to the controller 210 though a third communication channel 226. There can be multiple round robin pointers or a single round robin pointer, as depicted in FIG. 2, for each respective RAG. Moreover, there can be a single RAG or multiple RAGs, as depicted in FIG. 2. Also, each RAG will have at least one or more communication channels connected to a Controller 210 that operate in a variety of manners. Moreover, any of the aforementioned communications channels or MPs would encompass wireless links, optical links, conductor cable links, packet switched channels, direct communication channels and any combination thereof.

Associated with each RAG, there are a plurality of loan registers 230, 231, 232, 233, 234, 235, 236, 237, and 238. The use of loan registers 230, 231, 232, 233, 234, 235, 236, 237, and 238 allow for the accurate and efficient management of shared resources by accounting for the tokens borrowed from another RAG. A first loan register 230 is associated to the first RAG that corresponds to a first shared resource and is interconnected to the Controller 210 through a fourth communication channel 240. A second loan register 231 is associated to the first RAG that corresponds to a second shared resource and is interconnected to the Controller 210 through a fifth communication channel 241. A third loan register 232 is associated to the first RAG that corresponds to a third shared resource and is interconnected to the Controller 210 through a sixth communication channel 242. A fourth loan register 233 is associated to the second RAG that corresponds to the first shared resource and is interconnected to the Controller 210 through a seventh communication channel 243. A fifth loan register 234 is associated to the second RAG that corresponds to the second shared resource and is interconnected to the Controller 210 through an eighth communication channel 244. A sixth loan register 235 is associated to the second RAG that corresponds to the third shared resource and is interconnected to the Controller 210 through a ninth communication channel 245. A seventh loan register 236 is associated to the third RAG that corresponds to the first shared resource and is interconnected to the Controller 210 through a tenth communication channel 246. An eighth loan register 237 is associated to the third RAG that corresponds to the second shared resource and is interconnected to the Controller 210 through an eleventh communication channel 247. A ninth loan register 238 is associated to the third RAG that corresponds to the third shared resource and is interconnected to the Controller 210 through a twelfth communication channel 248.

There can be multiple loan registers or a single loan register, as depicted in FIG. 2, for each respective RAG. Moreover, there can be a single RAG or multiple RAGs, as depicted in FIG. 2. Also, each loan register will have at least one or more communication channels connected to a Controller 210 that operate in a variety of manners. There can be a single or multiple loan registers, as disclosed herein, to account for the loaning and borrowing of tokens among RAGs. Moreover, any of the aforementioned communications channels or MPs would encompass wireless links, optical links, conductor cable links, packet switched channels, direct communication channels and any combination thereof.

Figure 3:
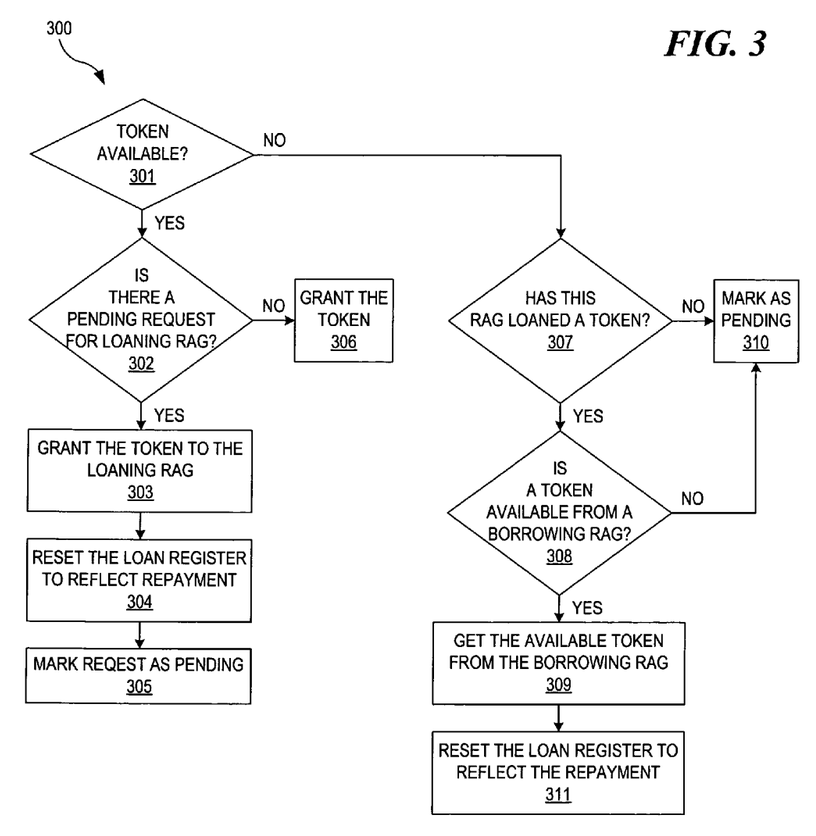
FIG. 3 depicts a flow chart that depicts token granting and loan registration for a requesting user group and a given shared resource at the time of a new request.
Figure 4:
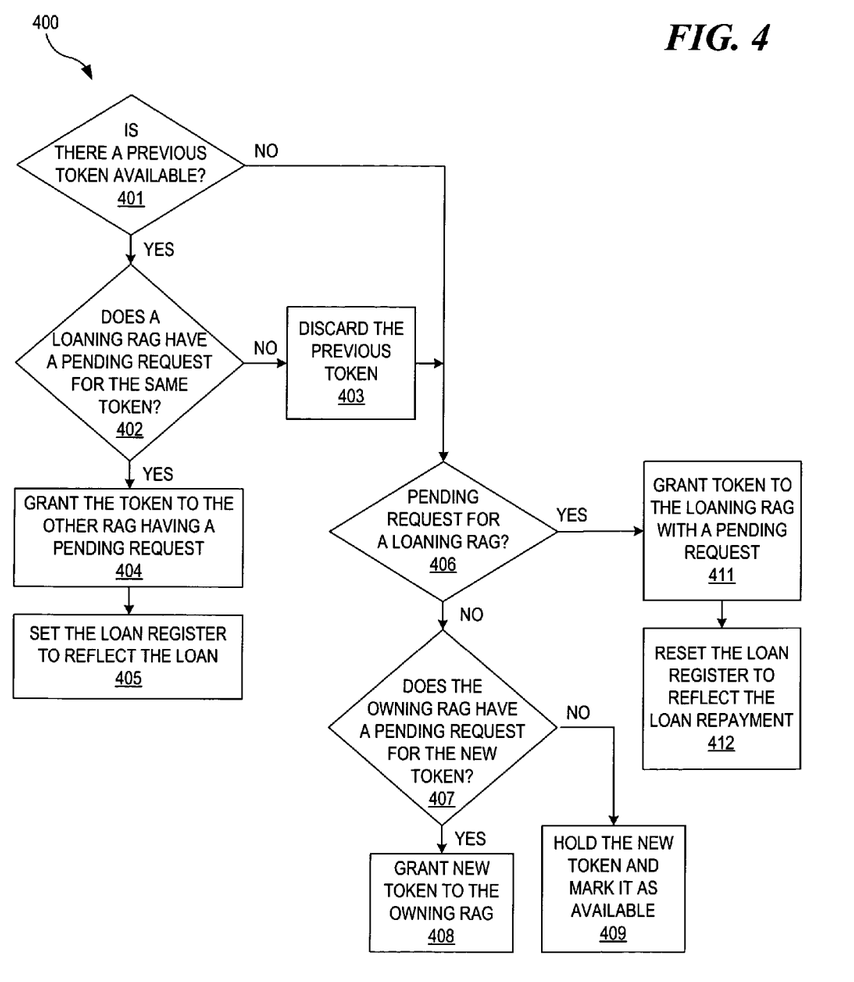
FIG. 4 depicts a flow chart that depicts token granting and loan registration for a regenerating user group and a given shared resource at the time of token generation.

In order to grant a token assigned to one RAG from a different RAG, the token manager 12 of FIG. 1 makes a determination of availability as illustrated in FIGS. 3 and 4. However, availability can become an issue at two strategic points: at the time of token generation and at the time of a new request. FIG. 3 depicts token granting and loan registration upon a new request. FIG. 4 depicts token granting and loan registration at the time of token generation. Also, it should be noted that the flow charts of FIGS. 3 and 4 collectively describe the operation of a RAG, a round-robin selector, a loan register, and the controller, collectively.

Referring to FIG. 3 of the drawings, the reference numeral 300 generally designates a flow chart that depicts token granting and loan registration for a requesting RAG and a given shared resource at the time of a new request.

In step 301, when a requesting RAG has a new request, there is a determination of whether there is a token available for the given shared resource. If there is a token available, there must be a further determination if there is a token request pending from another RAG that had previously loaned a token to this RAG 302. If there is not an outstanding loan for a token, then the available token is granted to the requesting RAG 306. However, if there is an outstanding loan, then the token is granted to the loaning RAG 303, repaying the loan. Also, upon repayment, the loan register is reset to reflect the repayment 304, and the requesting RAG's request is marked as pending 305.

In step 301, when a requesting RAG has a new request and there is not a token available, another sequence must be employed. Firstly, there should be a determination if the requesting RAG has loaned a token for the given resource 307. If a token has not been loaned, then the request is marked as pending 310. However, if there has been a loaned token, then there should be a determination if there is a token available from a borrowing RAG 308. If there is not a token available from a borrowing RAG, the request is marked as pending 310. If there is a token available from a borrowing RAG, then a token is obtained from the borrowing RAG 309, repaying the loan. Upon repayment the loan register is reset to reflect the repayment 311.

Referring to FIG. 4 of the drawings, the reference numeral 400 generally designates a flow chart that depicts token granting and loan registration for a regenerating RAG and a given shared resource at the time of a token generation.

In step 401, when a regenerating RAG is regenerating a token, there is a determination of whether there is a previous token available for the given shared resource. If there is a previously generated token available, there should be a determination if a loaning RAG has a pending request for the same token 402. However, if there is pending request elsewhere, then the token is granted to a RAG with a pending request 404, and the loan register is set to reflect the loan to the RAG with a pending request 405.

In the case where there is not a loaning RAG with a pending request for the same token, then another sequence should be employed. The previous token is discarded 403. Then, there should be a determination whether the owning RAG has a pending request for the new token 407. If there is a pending request, the new token is granted to the owning RAG 408. If there is not another pending request, then the previously generated token is held over until regeneration 409.

In step 401, when regenerating RAG is regenerating a token and there is not a previously generated token available, another sequence must be employed. Firstly, there must be a determination if there is a pending request for a loaning RAG 406. If there is not a pending request for a loaning RAG, Then, there should be a determination whether the owning RAG has a pending request for the new token 407. If there is a pending request, the new token is granted to the owning RAG 408. If there is not another pending request, then the previously generated token is held over until regeneration 409. However, if there is a pending request for a loaning RAG, the token is granted to the loaning requestor 411, repaying the loan. Upon repayment, the loan register is reset to reflect the repayment 412.

Hence, the accounting methodology allows for the preservation of the target allocation set forth by the preallocation algorithm. By accounting for the reallocation or loaning of generated tokens and subsequent realignment, the target allocation is only temporarily disturbed. Also, resources are utilized to the maximum extent, so as to prevent waste.

It will be understood from the foregoing description that various modifications and changes can be made in the preferred embodiment of the present invention without departing from its true spirit. This description is intended for purposes of illustration only and should not be construed in a limiting sense. The scope of this invention should be limited only by the language of the following claims.

What is claimed is:

1. An apparatus for managing tokens for usage of a shared resource in a computer system, comprising:
    a bus;
    a plurality of shared resources coupled to the bus;
    a plurality of requestor groups coupled to the bus, wherein each requestor of the plurality of requestor groups at least has the ability to request the usage of at least the shared resource of the plurality of shared resources;
    a control module coupled to the bus, wherein the control module is configured to allocate and is at least configured to reallocate tokens for usage of a shared resource;
    a plurality of arbitration modules coupled to the control module, wherein at least one arbitration module of the plurality of arbitration modules is associated with at least one requestor group of the plurality of requestor groups; and
    a plurality of memory cells coupled to the control module, wherein the plurality of memory cells is configured to account for reallocated tokens.

2. The apparatus of claim 1, wherein the control module allocates tokens to at least one requestor group of the plurality of requestor groups according to a preallocation program.

3. The apparatus of claim 2, wherein the plurality of arbitration modules further comprise a plurality of round robin arbitration modules.

4. The apparatus of claim 3, wherein the control module reallocates tokens of a first resource group having at least an available and unused token for at least one shared resource to a second resource group with at least one pending request for the at least one shared resource at least configured to be associated with the at least one available and unused token.

5. The apparatus of claim 4, wherein the memory cells further comprise registers.

6. The apparatus of claim 1, wherein the memory cells further comprise registers.

7. An apparatus for managing tokens for usage of shared resources in a computer system, comprising:
    a bus;
    a plurality of shared resources coupled to the bus;
    a plurality of requestor groups coupled to the bus, wherein each requestor of the plurality of requestor groups at least has the ability to request the usage of at least a shared resource of a plurality of shared resources;
    a control module coupled to the bus, wherein the control module performs the following operations:
        allocating tokens according to a preallocation program; and
        reallocating tokens of a first resource group having at least an available and unused token for at least one shared resource to a second resource group having a pending request for the at least one shared resource at least configured to be associated with the at least one available and unused token;
    a plurality of round robin arbitration modules coupled to the control module, wherein at least one arbitration module of the plurality of arbitration modules is associated wit at least one requestor group of the plurality of requestor groups; and
    a plurality of registers coupled tote control module, wherein the plurality of registers accounts for reallocated tokens.

8. A method for granting and reallocating tokens for usage of a shared resource in a computer system at the time of a new request by at least a first requestor group of a plurality of requestor groups for at least one shared resource of a plurality of shared resources, comprising:

determining if a first token is available;

if there is the first token available, determining if there is a pending request by a second requestor group of a plurality of requestor groups that has previously loaned a second token to the first requestor group for the at least one shared resource associated with the first token; and if there is a pending request by a second requestor group that has previously loaned the second token to the first requestor group for the at least one shared resource associated with the first token, granting the first token to the second requestor group to repay the second requestor group.

9. The method of claim 8, wherein the method further comprises:

if there is not a pending request by a second requestor group that has previously loaned the second token to the first requestor group for the at least one shared resource associated with the first token, granting the token to the first requestor group;

if there is a pending request by a second requestor group that has previously loaned the second token to the first requestor group for the at least one shared resource associated with the first token, resetting a memory cell to reflect a repayment by the first requestor group; and if there is a pending request by a second requestor group that has previously loaned the second token to the first requestor group for the at least one shared resource associated with the first token, marking the new request of the first requestor group as pending.

10. The method of claim 8, wherein the method further comprises:

if there is not a first token available, determining if the first requestor group has previously loaned a third token associated with the at least one shared resource to a third requestor group;

if there has not been a third token associated with to at least one shared resource, marking the new request of the first requestor group as pending;

if there has been a third taken associated with to at least one shared resource, determining if there is a fourth token available associated with the at least one shared resource from the third requestor group;

if there has been a third token associated with the at least one shared resource, granting a fourth token associated with the at least one shared resource from the third requestor group to the first requestor group; and if there has been a third token associated with the at least one shared resource, resetting a memory cell to reflect a repayment by the first requestor group.

11. A method for granting and reallocating tokens for usage of a shared resource in a computer system at the time of generating or regenerating a first token by a first requestor group of a plurality of requestor groups for at least one shared resource of a plurality of shared resources, comprising:

determining if there is a previously generated second token available;

if there is a previously generated second token available, determining if there is a pending request for the at least one shared resource by a second requestor group of a plurality of requestor groups;

if there is not a pending request by the second requestor group for the at least one shared resource, discarding the second token;

if there is a pending request by the second requestor group for the at least one shared resource, granting the second token to the second requestor having a pending request; and if there is a pending request by the second requestor group for the at least one shared resource, setting a memory cell to reflect the granting of the second token to the second requestor group.

12. The method of claim 11, wherein the method further comprises:

if there is not a previously generated second token, determining if there is a pending request for the at least one shared resource associated with the first token by a third requestor group of the plurality of requestor groups that has previously loaned a fourth token associated with the at least one shared resource to the first requestor group;

if there is not a pending request by the third requestor group for the at least one shared resource, granting the first token to the first requestor group;

if there is a pending request by the third requestor group for the at least one shared resource, granting the first token to the third requestor to repay; and if there is a pending request by the third requestor group for the at least one shared resource, resetting a memory cell to reflect the repaying by the first token.

13. The method of claim 12, wherein the method further comprises:

determining if there is a pending request by the first requestor group for the at least one shared resource;

if there is a pending request for the at least one shared resource by the first requestor group, then granting the first token to the first requestor group; and if there is not a pending request for the at least one shared resource by the first requestor group, holding the first token until regeneration.

14. A computer program product for implementing a method for granting and reallocating tokens for usage of a shared resource in a computer system at the time of a new request by a first requestor group of a plurality of requestor groups for at least one shared resource of a plurality of shared resources, the computer program product having a medium with a computer program embodied thereon, the computer program comprising:

computer product code for determining if a first token is available; and if there is the first token available, computer product code for determining if there is a pending request by a second requestor group of a plurality of requestor groups that has previously loaned a second token to the first requestor group for the at least one shared resource associated with the first token; and if there is a pending request by a second requestor group that has previously loaned the second token to the first requestor group for the at least one shared resource associated with the first token, computer product code for granting the first token to the second requestor group to repay the second requestor group.

15. The computer program product of claim 14, wherein the computer product code further comprises:

if there is not a pending request by a second requestor that has previously loaned the second token to the first requestor group for the at least one shared resource associated with the first token, computer product code for granting the first token to the first requestor group.

16. The computer program product of claim 15, wherein the computer product code further comprises:

if there is a pending request by a second requestor group that has previously loaned the second token to the first requestor group for the at least one shared resource associated with the first token, computer product code for resetting a memory cell to reflect a repayment by the first requestor group; and if there is a pending request by a second requestor group that has previously loaned the second token to the first requestor group for the at least one shared resource associated with the first token, computer product code for making the new request of the first requestor group as pending.

17. The computer program product of claim 16, wherein the computer product code further comprises:

if there is not a first token available, computer product code for determining if the first requestor group has previously loaned a third token associated with the at least one shared resource to a third requestor group;

if there has not been a third token associated with the at least one shared resource, computer product code for marking the new request of the first requestor group as pending;

if there has been a third token associated with the at least one shared resource, computer product code for determining if there is a fourth token available associated with the at least one shared resource form the third requestor group;

if there has been a third token associated with the at least one shared resource, computer product code for granting a fourth taken associated with the at least one shared resource from the third requestor group to the first requestor group; and if there has been a third token associated with the at least one shared resource, computer product code for resetting a memory cell to reflect a repayment by the first requestor group.

18. A computer program product for implementing a method for granting and reallocating tokens for usage of a shared resource in a computer system at the time of generating or regenerating a first token by a first requestor group of a plurality of requestor groups for at least one shared resource of a plurality of shared resources, the computer program product having a medium with a computer program embodied thereon, the computer program comprising:

computer product code for determining if there is a previously generated second token available;

if there is a previously generated second token available, computer product code for determining if there is a pending request for the at least one shared resource by a second requestor group of the plurality of requestor groups;

if there is not a pending request by the second requestor group for the at least one shared resource, computer product code for discarding the second token;

if there is a pending request by the second requestor group for the at least one shared resource, computer product code for granting the second token to the second requestor having a pending request; and if there is a pending request by the second requestor group for the at least one shared resource, computer product code for setting a memory cell to reflect the granting of the second token to the second requestor group.

19. The computer program product of claim 18, wherein the computer product code further comprises:

if there is not a previously generated second token, computer product code for determining if there is a pending request for the at least one shared resource associated with the first token by a third requestor group of the plurality of requestor groups that has previously loaned a fourth token associated with the at least one shared resource to the first requestor group;

determining if there is a pending request by a third requestor group for the at least one shared resource group;

if there is not a pending request by the third requestor group for the at least one shared resource, computer product code for granting the first token to the first requestor group;

if there is a pending request by the third requestor group for the at least one shared resource, computer product code for granting the first token to the third requestor to repay; and if there is a pending request by the third requestor group for the at least one shared resource, computer product code for resetting a memory cell to reflect the repaying by the first token.

20. The computer program product of claim 19, wherein the computer program product further comprises:

computer product code for determining if there is a pending request by the first requestor group for the at least one shared resource;

if there is a pending request for the at least one shared resource by the first requestor group, then computer product code for granting the first token to the first requestor group; and if there is not a pending request for the at least one shared resource by the first requestor group, computer product code for holding the first token until regeneration.

* * * * *